United States Patent Office 2,915,498
Patented Dec. 1, 1959

2,915,498

MODIFIED ACROLEIN - PENTAERYTHRITOL REACTION PRODUCTS AND THEIR PRODUCTION

William M. Kraft, Verona, N.J., assignor to Heyden Newport Chemical Corporation, a corporation of Delaware No Drawing. Application January 10, 1956
Serial No. 558,191

8 Claims. (Cl. 260—47)

The present invention relates to the production of modified acrolein-pentaerythritol resinous products and more particularly relates to the production of such resins having novel characteristics. The present invention is also concerned with the novel products produced by the present process.

Pentaerythritol and acrolein can be reacted to produce synthetic resins. The resinification reactions take place in two stages. In the first stage the pentaerythritol and acrolein react to form what may be referred to as a prepolymer or a pre-condensate. This prepolymer is essentially a mixture of monoallylidene-pentaerythritol and diallylidene-pentaerythritol or their low molecular weight reaction products. The acetalization reaction occurring in the first stage takes place in the presence of an acidic catalyst and substantially in accordance with the following two reactions to form an aqueous solution of the prepolymer.

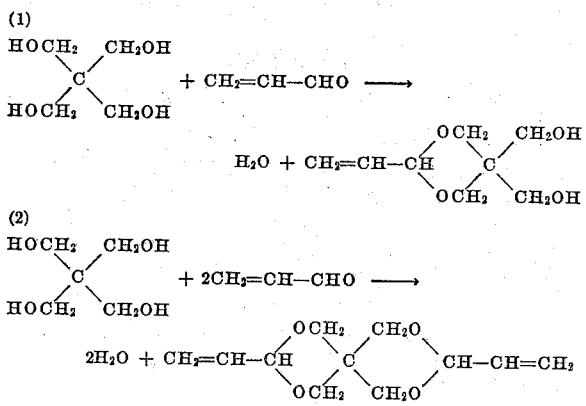

For the sake of brevity the mixture of monoallylidene and diallylidene-pentaerythritol produced in the first stage will be referred to as "prepolymer" or "acrolein-pentaerythritol prepolymer."

In the second stage and after dehydration to remove the water formed during the first stage along with at least most of any unreacted acrolein, the prepolymer is cured in the presence of an acidic condensation catalyst. In this curing stage the diallylidene-pentaerythritol and monoallylidene-pentaerythritol react with monoallylidene-pentaerythritol and pentaerythritol, if any unreacted pentaerythritol is present, to form a hard resin. While the reactions taking place during the second or curing stage are not fully understood, apparently both polymerization and condensation reactions take place. In order to cure properly, the prepolymer must contain some monoallylidene-pentaerythritol. Thus, the maximum amount of acrolein which can be reacted with the pentaerythritol in the first stage is somewhat less than 2 moles of acrolein per mole of pentaerythritol. The preferred minimal amount of acrolein is one mole per mole of pentaerythritol. This minimal amount of acrolein will produce a prepolymer containing monoallylidene-pentaerythritol and diallylidene-pentaerythritol plus some unreacted pentaerythritol. In general, I prefer to react about 3.5–5.0 moles of acrolein with each 3 moles of pentaerythritol. However, it is to be understood that about 2.75–6 moles of acrolein for each 3 moles of pentaerythritol constitutes the extreme range. The acidic catalyst which promotes curing may be the same as the catalyst used during the first stage. While p-toluene sulfonic acid is the preferred catalyst, other acidic condensation catalysts such as oxalic acid, hydrochloric acid, phosphoric acid, boron trifluoride, or the like may be used in each stage. The properties of the cured resin will depend to a certain extent upon the proportions of the reactants, as well as the particular catalysts used. The properties of the cured resin may be modified by incorporating other compounds such as plasticizers with the prepolymer prior to curing.

The cured acrolein-pentaerythritol resins are hard and in general are at least fairly clear and may or may not be colored. However, soft cured resins may be obtained by incorporating a plasticizer, preferably, prior to the curing stage. These acrolein-pentaerythritol resins are thermoplastic. One serious drawback of the acrolein-pentaerythritol resins is their flammability. Films of these resins readily burn upon ignition with the formation of flaming drops of molten material and the formation of combustible obnoxious, gaseous by-products.

I have discovered that the flammability of such resins can be decreased along with the elimination of the formation of flaming drops of material by modifying the resin with certain phenolic compounds. While the phenolic compound does not render the resin entirely flame-resistant, it greatly decreases the rate of combustion and relatively larger amounts of phenolic compound will make the resin sufficiently resistant to burning so as to be self-extinguishing. In other words, if a piece of the phenolic modified resin is ignited by means of a flame, the resin will stop burning upon removal of the flame. Even relatively small amounts of phenolic compound will prevent the formation of molten drops of burning resinous material. Somewhat surprisingly, the phenolic compound does not appreciably alter the thermoplasticity of the resin.

The phenolic compound is mixed with the prepolymer preferably after dehydration and prior to the curing step. Apparently, the phenolic compound reacts with the prepolymer during curing to produce a clear resin which except for its decreased flammability has substantially the same characteristics as a similar resin not containing the phenolic compound.

The phenolic compound may be phenol, resorcinol, hydroquinone, catechol or mixtures thereof. All of these phenolic compounds are either mono- or dihydric benzenes. The amount of phenolic compound used may be varied over a wide range and in general, the larger amounts will have a somewhat greater effect in decreasing flammability than the smaller amounts. At least about 5% of phenolic compound is required to make any appreciable difference in the flammability of the resin. In general, I prefer to use not more than 30% of phenolic compound, although up to 50% may be used at times. Preferably, the amount of phenol should not be in excess of the amount which is compatible with the prepolymer. The percentage of phenolic compound is based on the weight of prepolymer, that is, the weight of reacted acrolein and pentaerythritol.

The following examples illustrate the present invention. In these examples as well as throughout this specification and the accompanying claims all percentages are by weight. As described in Example 1, the prepolymer used was stabilized by neutralizing the acidic catalyst with choline. The purpose of stabilization is to permit storage of the prepolymer without curing. However, the prepolymer need not be stabilized particularly when the prepolymer is cured shortly after formation. While the prepolymer may be neutralized with other basic compounds such as NaOH or sodium acetate, I prefer either to neutralize the prepolymer with choline or to deionize the prepolymer with an anion exchange resin. The use of choline as a neutralizing agent is more fully described in my co-pending application Ser. No. 552,300, filed December 12, 1955, Patent No. 2,870,121. The deionization of the prepolymer is more fully described in a co-pending application Ser. No. 558,200, filed January 10, 1956, by Silverman and Balgley. The use of ion exchange resin has the advantage in that the acidic material including the catalyst is removed from the prepolymer and there are no insoluble materials present which tend to cloud the cured resin as are present when basic materials such as sodium hydroxide or sodium acetate are used for neutralization. The use of choline has the advantage of forming with the acidic catalyst a compound which is completely soluble in the prepolymer and the cured resin, so that the resin is clear. In addition and for some unknown reason, the use of choline results in cured resins of relatively lighter color and even lighter color than those obtained upon the curing of prepolymers deionized with anion exchange resin. Of course, when the prepolymer is stabilized, acidic condensation catalyst is subsequently mixed with the prepolymer before the curing stage.

Example 1

The first stage reaction, that is, production of the prepolymer, was carried out in a flask equipped with a reflux condenser, an agitator and means for flowing nitrogen into the flask so that the reaction would take place out of contact with the air. A mixture of 2448 grams (18 moles) of pentaerythritol, 1680 grams (30 moles) of technical grade acrolein, 13.5 grams of p-toluene sulfonic acid monohydrate (catalyst) and 1.68 grams of hydroquinone was placed in the flask. The hydroquinone was added as a polymerization inhibitor to prevent polymereization of the acrolein with itself. The mixture was gradually heated over a period of 10–12 minutes to a reflux temperature of 48° C. Heating was gradually continued and after 30 minutes the reflux temperature was 70° C. Thereafter the mixture was held at 79° C. for 90 minutes. The resulting aqueous solution had a viscosity at 25° C. of J on the Gardner-Holt scale. Seventeen grams of a 50% solution of choline and methanol was added to the aqueous reaction mixture with stirring to raise the pH of the solution to 6.5. The solution was filtered to remove a small amount of undissolved impurities, not a choline catalyst reaction product. Thereafter the neutralized aqueous solution was heated at 40–50° C. under a reduced pressure of 120 mm. mercury until about 600 ml. of distillate had been collected. Thereafter the solution was heated at 80° C. at an absolute pressure of 10–20 mm. mercury for an hour to remove the remainder of the water. The removed water contained some unreacted acrolein. The dehydrated allylidene-pentaerythritol weighed 3352 grams and had a hydroxyl content of 9.0%, an Iodine No. of 117 and a mol. wt. of 320. This neutralized prepolymer was quite stable and could be stored indefinitely without polymerization or decomposition.

This stable prepolymer or one prepared in substantially the same manner was used in the preparation of the cured resins as described in the following examples.

Example 2

A mixture of 450 grams of prepolymer, 45 grams of phenol and 1.4 grams of p-toluene sulfonic acid dissolved in 3 ml. of methanol was placed in a flask and heated for one hour with agitation at 60° C. This viscous, phenol modified prepolymer was cast in ¼" thick sheets in molds and cured at 75° C. overnight. The resulting sheets of light colored brittle resin were considerably less flammable than unmodified acrolein-pentaerythritol rersin prepared in the same manner, except for the omission of any phenolic modifying agent.

Example 3

A mixture of 10 grams of acrolein-pentaerythritol prepolymer, 1 gram of resorcinol and a small catalytic amount of oxalic acid was cast in a ¼" thick sheet and cured at 90° C. for 18 hours. The resulting product was a hard, tough but somewhat flexible, opaque, orange resin. This modified resin was also considerably less flammable than a similar unmodified resin.

Example 4

The acrolein-pentaerythritol prepolymer was mixed with 5% of its weight of hydroquinone and a small catalytic amount of p-toluene sulfonic acid. The mixture was cast into ¼" thick sheets and cured at 90° C. for 16.5 hours. The cured, tough resin was clear with a yellowish color and was relatively resistant to burning.

Example 5

The prepolymer of Example 1 was mixed with 30% resorcinol based on the weight of the prepolymer and a small catalytic amount of oxalic acid. The mixture was cast in ¼" thick sheets and cured in an oven at 90° C. for 18 hours. The cured product was a brittle green resin which was relatively resistant to burning and which was self-extinguishing after being ignited with a flame.

Example 6

A mixture of prepolymer containing 10% hydroquinone and a catalytic amount of p-toluene sulfonic acid was heated for one hour at 60° C. The syrupy mixture was then cast into ¼" thick sheets and the sheets were cured at 80° C. overnight. These sheets were found to have considerable better flame-resistance than similarly prepared sheets of the corresponding unmodified resin not containing any phenolic compound.

Example 7

The prepolymer was mixed with 10% of phenol while cold and thereafter 0.3% of p-toluene sulfonic acid catalyst was added. Both percentages were based on the weight of prepolymer. Then the mixture was heated at 60° C. for one hour and cast in ¼" sheets. These sheets were cured at 100° C. for 18 hours. These had a considerably better resistance to burning than sheets prepared in a similar manner from a prepolymer not modified with phenol, otherwise the properties of the two groups of sheets were closely similar.

Having described the present invention in detail, it is obvious that various modifications may be made therein. In the foregoing examples, the neutralized prepolymer has been modified with phenolic compound in the presence of the acidic catalyst. However, the acidic catalyst is preferably omitted when it is desired to modify the prepolymer and then hold or store the modified prepolymer prior to curing. Also, the acidic catalyst may be omitted when it is desirable to ship the phenol modified prepolymer in a stable condition to a manufacturer of the cured resins. Plasticizers and other modifiers may be incorporated with the prepolymer prior to curing. In any event, the percentage of phenolic compound set forth is based on the weight of prepolymer, that is, the weight of reacted acrolein-pentaerythritol.

I claim:

1. In the process of producing flame-resistant acrolein-pentaerythritol resins wherein pentaerythritol is reacted with acrolein to form a prepolymer including monoallylidene-pentaerythritol and diallylidene-pentaerythritol and thereafter the prepolymer is cured to form an acrolein-pentaerythritol resin, the improvement comprising mixing such a prepolymer with from 5% to 50% by weight of a phenolic compound selected from the group consisting of phenol, resorcinol, hydroquinone, catechol and mixtures thereof, and thereafter curing the prepolymer-phenolic compound mixture in the presence of an acidic condensation catalyst to form a resin.

2. In the process of producing flame-resistant acrolein-pentaerythritol resins wherein pentaerythritol is reacted with acrolein to form a prepolymer including monoallylidene-pentaerythritol and diallylidene-pentaerythritol and thereafter the prepolymer is cured to form an acrolein-pentaerythritol resin, the improvement comprising mixing such a prepolymer with from 5% to 30% by weight of a phenolic compound selected from the group consisting of phenol, resorcinol, hydroquinone, catechol and mixtures thereof, and thereafter curing the prepolymer-phenolic compound mixture in the presence of an acidic condensation catalyst to form a resin.

3. In the process of producing flame-resistant acrolein-pentaerythritol resins wherein pentaerythritol is reacted with acrolein to form a prepolymer including monoallylidene-pentaerythritol and diallylidene-pentaerythritol and thereafter the prepolymer is cured to form an acrolein-pentaerythritol resin, the improvement comprising mixing such a prepolymer with about 5-30% by weight of phenol, and thereafter curing the prepolymer-phenol mixture in the presence of an acidic condensation catalyst to form a resin.

4. In the process of producing flame-resistant acrolein-pentaerythritol resins wherein pentaerythritol is reacted with acrolein to form a prepolymer including monoallylidene-pentaerythritol and diallylidene-pentaerythritol and thereafter the prepolymer is cured to form an acrolein-pentaerythritol resin, the improvement comprising mixing such a prepolymer with from 5% to 30% by weight of a phenolic compound selected from the group consisting of phenol, resorcinol, hydroquinone, catechol and mixtures thereof, and thereafter curing the prepolymer mixture in the presence of p-toluene sulfonic acid condensation catalyst.

5. The resin produced in accordance with the process of claim 3.

6. The resin produced in accordance with the process of claim 4.

7. The resin produced in accordance with the process of claim 1.

8. The resin produced in accordance with the process of claim 2.

References Cited in the file of this patent

UNITED STATES PATENTS 2,401,776    Rothrock _____ June 11, 1946

FOREIGN PATENTS 868,351    Germany _____ Feb. 23, 1953